(12) United States Patent
Sheng et al.

(10) Patent No.: US 8,489,965 B1
(45) Date of Patent: *Jul. 16, 2013

(54) LONG LATENCY PROTOCOL FOR HARD DISK CONTROLLER INTERFACE

(75) Inventors: Hongying Sheng, San Jose, CA (US); Job Lam, Palo Alto, CA (US); Kai-Chuan Chang, Fremont, CA (US); Jianke Li, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,313

(22) Filed: Jul. 2, 2012

Related U.S. Application Data

(63) Continuation of application No. 12/181,172, filed on Jul. 28, 2008, now Pat. No. 8,214,719.

(60) Provisional application No. 60/952,067, filed on Jul. 26, 2007.

(51) Int. Cl.
*G11C 29/00* (2006.01)

(52) U.S. Cl.
USPC .......................................................... 714/763

(58) Field of Classification Search
None
See application file for complete search history.

(56) References Cited

U.S. PATENT DOCUMENTS

| 7,199,954 B2 | 4/2007 | Lee et al. |
| 7,612,959 B2 | 11/2009 | Tang et al. |
| 7,764,453 B1 | 7/2010 | Lam |

*Primary Examiner* — Michael Maskulinski

(57) ABSTRACT

Some of the embodiments of the present disclosure provide a method comprising receiving a stream of codewords from a hard disk controller (HDC), receiving a write gate signal, the write gate signal configured to request a read/write (R/W) channel to write at least a first part of the stream of codewords to a media, and receiving a symbol count signal indicating a number of symbols in the first part of the received stream of codewords. Other embodiments are also described and claimed.

11 Claims, 10 Drawing Sheets

LONG LATENCY PROTOCOL FOR HARD DISK CONTROLLER INTERFACE

CROSS REFERENCE TO RELATED APPLICATIONS

This application is a continuation of, and claims priority to, co-pending, commonly-owned to U.S. patent application Ser. No. 12/181,172, filed Jul. 28, 2008, entitled "Long Latency Protocol for Hard Disk Controller Interface," and U.S. Provisional Patent Application No. 60/952,067 filed Jul. 26, 2007, entitled "Long Latency Protocol for HDC-RDC Interface in SOC Mode," the entire specification of which is hereby incorporated by reference in its entirety for all purposes, except for those sections, if any, that are inconsistent with this specification.

TECHNICAL FIELD

Embodiments of the present disclosure relate to the field of hard disk controllers, and more particularly, long latency protocol for hard disk controller interfaces.

BACKGROUND

FIG. 1 illustrates an exemplary disk drive system 10, including a hard disk controller (HDC) 12 that interfaces with a read/write channel (R/W channel) 14. The R/W channel 14 may be in communication with a media 16 (e.g., a disk). Data transfer between HDC 12 and the R/W channel 14 may be synchronized by a number of control signals, e.g., read gate (RGATE) and write gate (WGATE) control signals. In a read operation, R/W channel 14 may process an incoming signal from media 16 and transfer the data to HDC 12. In a write operation, data may be transferred from HDC 12 to the R/W channel 14 to be written to the media 16.

In various embodiments, latency may refer to the time or byte delay that data remains in the R/W channel. For example, some disk drive systems may have latencies of about 20 bytes which, depending on the particular system, may amount to a time delay of between about 800 nanoseconds (ns) and 5 milliseconds (ms).

Technology such as iterative coding (e.g., turbo coding, low-density parity-check coding (LDPC coding), etc.), which is being introduced into modern disk drive systems, may involve more processing before the data is available. That is, the latency within which the R/W channels encode and decode may be relatively longer, and hence, it may be desired that the R/W channels tolerate relatively higher latencies.

In the last few years, R/W channels have been developed that may tolerate relatively higher latencies. In addition, long latency protocols have also been developed.

In some of the long latency protocols, the R/W channel may not know in advance the number of symbols to be written to the media for a corresponding WGATE high signal. In various embodiments, the R/W channel may have to count the number of symbols between a falling edge of the WGATE signal and a falling edge of another appropriate control signal to ascertain the number of symbols to be written to the media (or the number of symbols to be read back from the media) for an assertion of the WGATE signal.

SUMMARY

In various embodiments, the present disclosure provides an apparatus and a method for hybrid clock networks. More specifically, there is provided, in accordance with various embodiments of the present disclosure, a method comprising receiving a stream of codewords from a hard disk controller (HDC), receiving a write gate signal, the write gate signal configured to request a read/write (R/W) channel to write at least a first part of the stream of codewords to a media, and receiving a symbol count signal indicating a number of symbols in the first part of the received stream of codewords. The method may further comprise encoding at least a first codeword from the received stream of codewords, transmitting a write data ready signal based at least in part on said encoding the at least first codeword, and receiving said write gate signal responsive at least in part to said transmitting the write data ready signal.

In various embodiments, said encoding may further comprise encoding at least the first codeword using an iterative encoding algorithm and/or a low-density parity-check coding (LDPC) algorithm. The method may further comprise encoding at least the first part of the received stream of codewords, and transmitting the encoded stream of codewords to the media. The method may further comprise receiving an interruption signal, and interrupting said receiving of the stream of codewords from the HDC responsive at least in part to receiving said interruption signal. Said receiving the interruption signal may further comprise receiving the interruption signal responsive at least in part to a write format buffer and/or a parity buffer in the R/W channel becoming substantially full. The method may further comprise clearing the interruption signal, and resuming said receiving the stream of codewords from the HDC.

There is provided, in accordance with various embodiments of the present disclosure, an apparatus comprising a write format buffer configured to receive data to be written to a media, the data including a plurality of codewords, each codeword including a plurality of symbols, an encoder configured to receive said data and to encode parity bits for one or more codewords of said plurality of codewords, and a parallel to serial converter configured to process said one or more codewords, wherein the apparatus may be configured to receive a symbol count signal indicating a number of symbols to be written to said media corresponding to a write gate signal. The apparatus may further comprise a parity buffer configured to buffer said encoded parity bits for said one or more codewords. The apparatus may be further configured to generate a write fault signal based at least in part on detecting a buffer overflow condition in said write format buffer and/or said parity buffer. The apparatus may further comprise a multiplexer configured to receive said encoded parity bits for said one or more codewords and to receive said processed one or more codewords, and to output write output data, wherein the apparatus may be further configured to write said write output data to the media. The apparatus may be further configured to transmit a write data ready signal to a hard disk controller (HDC) responsive at least in part to the encoder encoding parity bits for at least a first codeword of said plurality of codewords.

In various embodiments, the apparatus may be configured to receive from the HDC said write gate signal responsive at least in part to said transmission of the write data ready signal. The apparatus and the HDC may be embedded in a single integrated circuit chip. The apparatus may be further configured to generate a write fault signal responsive at least in part to detecting a fault in said apparatus, in the media, and/or in a hard disk controller coupled to said apparatus. The apparatus may be further configured to interrupt said receiving data in the write format buffer and encoder, responsive at least in part to said generating the write fault signal.

There is also provided, in accordance with various embodiments of the present disclosure, a method comprising receiving a read gate signal, receiving a symbol count signal indicating a number of symbols to be read corresponding to said read gate signal, and receiving a first codeword from the media, wherein the first codeword includes said number of symbols. The method may further comprise decoding and formatting the first codeword, transmitting a read data valid signal responsive at least in part to said decoding and formatting the first codeword, and transmitting said decoded and formatted codeword to a hard disk controller responsive at least in part to said transmitting the read data valid signal.

In various embodiments, the method may further comprise receiving a fault signal, and terminating said receiving the first codeword, before the entire first codeword is received, responsive at least in part to said receiving the fault signal. The method may further comprise receiving a fault clear signal, and resuming said receiving the first codeword responsive at least in part to said receiving the fault clear signal.

There is also provided, in accordance with various embodiments of the present disclosure, an article comprising a computer-readable storage medium; and instructions stored in the storage medium, and configured to program a processor to enable the processor to receive a stream of codewords from a HDC, receive a write gate signal, the write gate signal configured to request a R/W channel to write at least a first part of the stream of codewords to a media, and receive a symbol count signal indicating a number of symbols in the first part of the received stream of codewords. The processor may be enabled to encode at least a first codeword from the received stream of codewords, transmit a write data ready signal based at least in part on said encoding the at least first codeword, and receive said write gate signal responsive at least in part to said transmitting the write data ready signal.

In various embodiments, the processor may be enabled to receive an interruption signal, and interrupt said receiving of the stream of codewords from the HDC responsive at least in part to receiving said interruption signal. The processor may be enabled to clear the interruption signal, and resume said receiving the stream of codewords from the HDC.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Figure 1:
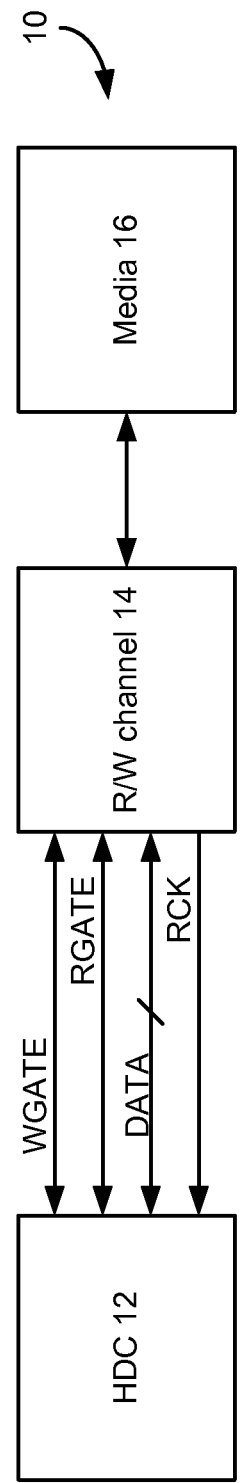
FIG. 1 illustrates an exemplary disk drive system, including a hard disk controller (HDC) that interfaces with a read/write channel (R/W channel)
Figure 2:
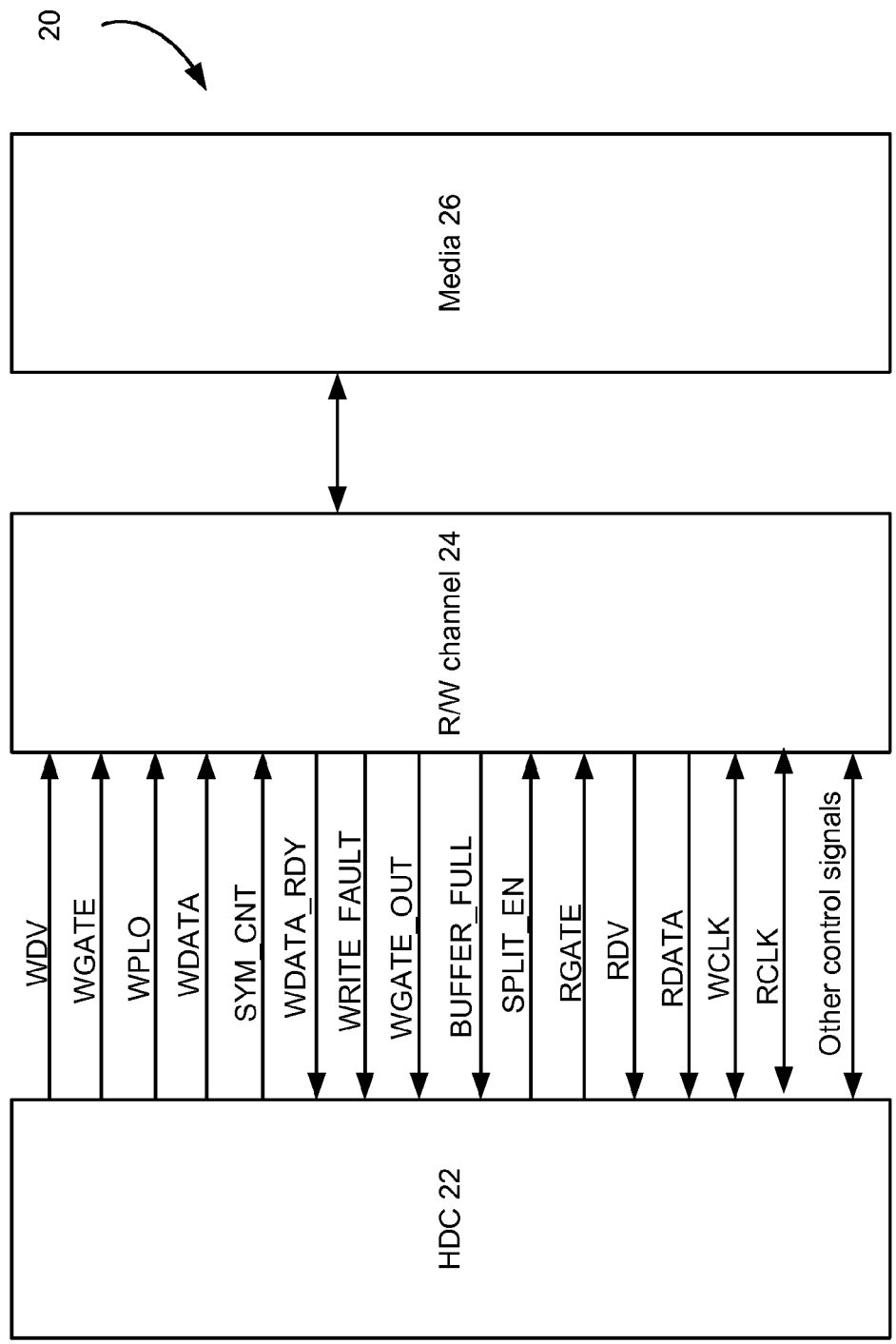
FIG. 2 illustrates an exemplary disk drive system, including a HDC that interfaces with an R/W channel, in accordance with various embodiments of the present disclosure.

FIG. 2 illustrates an exemplary disk drive system 20, including a HDC 22 that interfaces with an R/W channel 24, in accordance with various embodiments of the present disclosure. The R/W channel 24 may be in communication with a media 26 (e.g., a disk).

In various embodiments, the HDC 22 and R/W channel 24 may be included in a single integrated circuit chip. For example, the HDC 22 and R/W channel 24 may be included in a single system-on-chip (SOC), and accordingly, their mode of operation may be referred to as an SOC mode.

Data transfer between the HDC 22 and the R/W channel 24 may be synchronized by a number of control signals, some of which are illustrated in FIG. 2 and will be discussed in more detail herein later.

During a write operation, data may be transferred from the HDC 22 to the R/W channel 24, processed by the R/W channel 24 (by possibly encoding, decoding and/or formatting the data), and written to the media 26. Similarly, during a read operation, the R/W channel 24 may process an incoming data from media 26 and transfer the data to HDC 22.

In various embodiments, at least some signals from the HDC 22 to the R/W channel 24 and/or at least some signals associated with a write operation may be synchronized with a write clock signal WCLK. Similarly, at least some signals from the R/W channel 24 to the HDC 22 and/or at least some signals associated with a read operation may be synchronized with a read clock signal RCLK.

Figure 3:
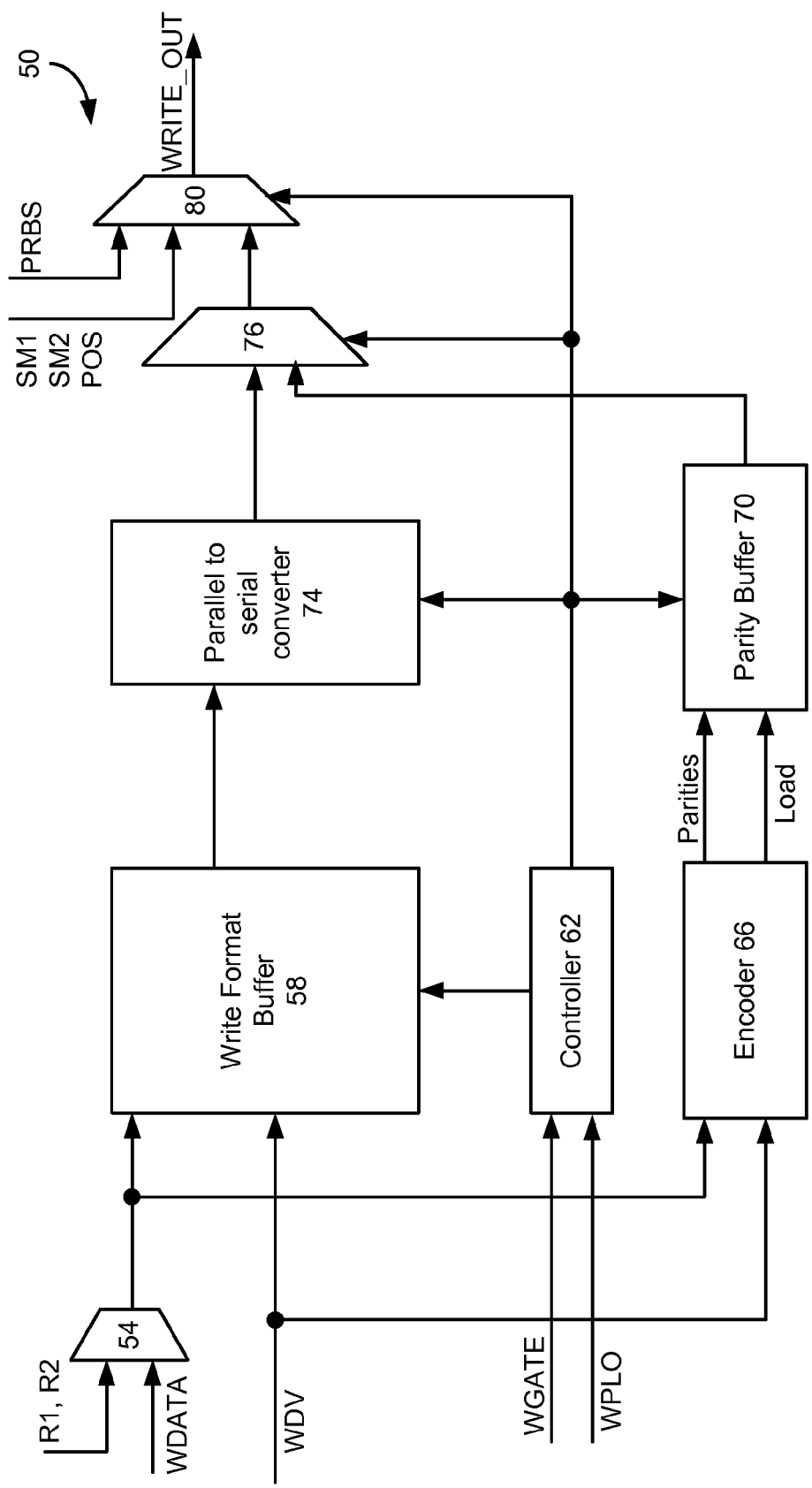
FIG. 3 illustrates a write block included in the R/W channel of FIG. 2, in accordance with various embodiments of the present disclosure.

FIG. 3 illustrates a write block 50 included in the R/W channel 24 of FIG. 2, in accordance with various embodiments of the present disclosure. In various embodiments, the write block 50 may include a multiplexer 54 configured to receive a WDATA signal from the HDC 22 of FIG. 2, wherein the WDATA signal may include data the HDC 22 intends to be written to the media 26. The multiplexer 54 may also receive various channel assigned register values (e.g., R1 and R2) of a reference data.

The output of the multiplexer 54 may be coupled to a write format buffer 58 and an encoder 66. In various embodiments, the write format buffer 58 may be, for example, a 1.5 Kilobit (Kb) dual port static random access memory (SRAM), although any other appropriate memory type or size may also be used instead. The write format buffer 58 may also receive a write data valid signal WDV from the HDC 22, and the output of the write format buffer 58 may be coupled to a parallel to serial converter 74.

The encoder 66 may be configured to encode and/or decode WDATA according to any appropriate type of encoding format. For example, the encoder 66 may implement an iterative encoding (e.g., LDPC, turbo coding, etc.). The encoder 66 outputs may be coupled to a parity buffer 70, the output of which may be coupled to a second multiplexer 76.

The write block 50 may also include a controller 62, which may be configured to receive control signals WGATE and WPLO from the HDC 22 and may further be configured to control one or more operations of the write block 50, including one or more operations of the write format buffer 58, parity buffer 70, parallel to serial converter 74, second multiplexer 76 and/or a third multiplexer 80.

The third multiplexer 80 may receive the output of the second multiplexer 76, a pseudo random binary sequence (PRBS) signal, and/or a selected one of a sync mark 1 (SM 1), SM2, or POS signal. The PRBS signal may be received from the HDC 22 or may be generated internally by the R/W channel 24. The POS signal, in various embodiments, may be used as a suffix to a data section being written in the media and may be a special pattern data field used for synchronization of the data section with other signals and/or for indication of an end of a data section.

In various embodiments, the HDC 22 may intend to write either a full sector or a split sector of data to the media 26 through the write block 50 included in the R/W channel 24. For example, at the beginning of writing a sector of data in the media 26, the HDC 22 may intend to write the full sector of data to the media 26. However, the writing process may be interrupted for various reasons, including but not limited to a buffer overflow condition in the write formal buffer 58 and/or parity buffer 70, an error condition in the writing process, a WRITE_FAULT signal from the R/W channel 24, etc. Some of these conditions will be discussed in more details herein later. When the cause of the interruption is resolved, e.g., when re-starting the write process, the HDC 22 may intend to write only the remaining part of the data sector (the first part being written before the interruption), resulting in writing only a split data sector. In various embodiments, the HDC 22 may generate a split enable signal SPLIT_EN to indicate that it intends to write a split data sector.

Figure 4:
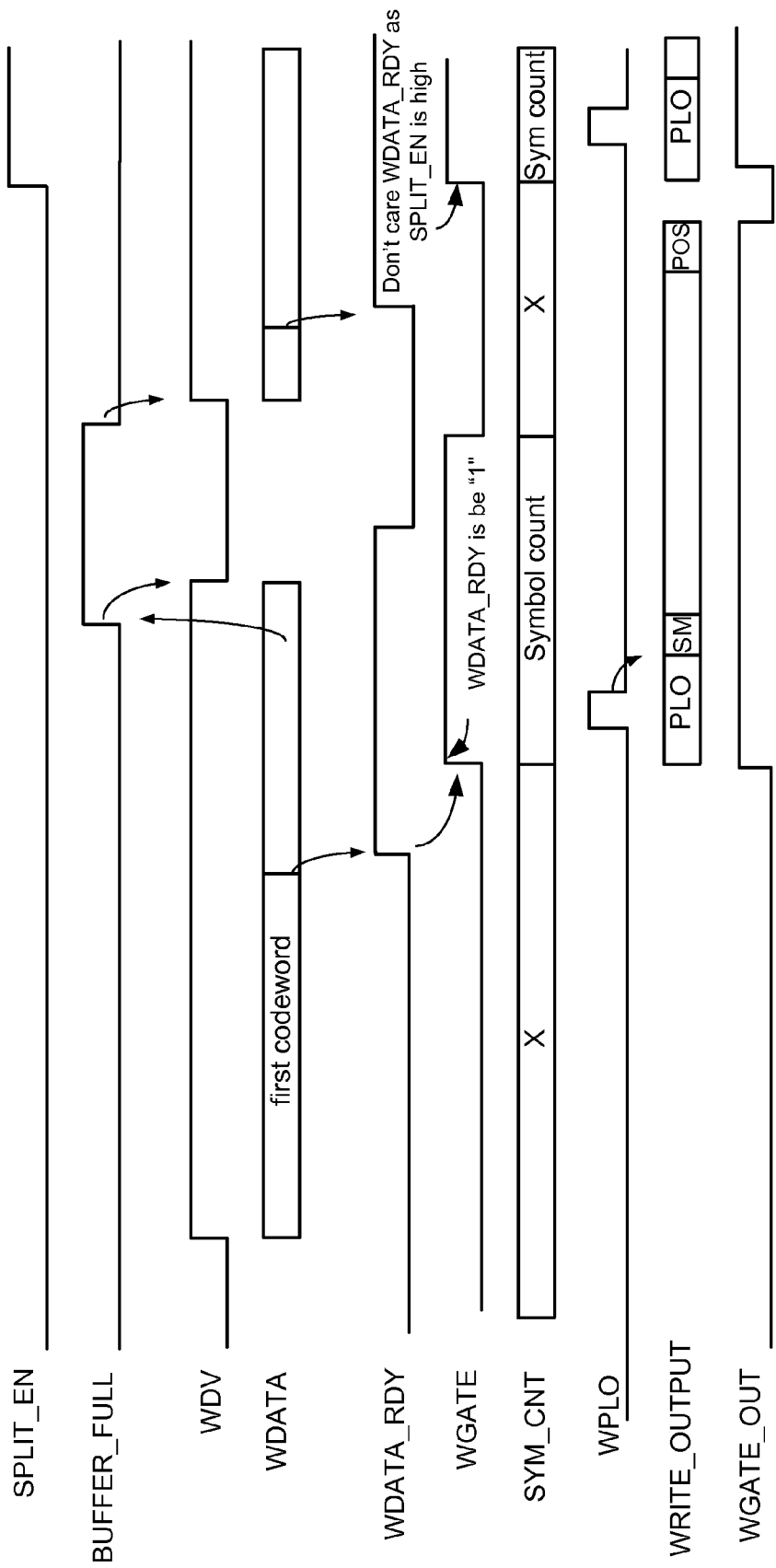
FIG. 4 illustrates an exemplary timing diagram of the operation of the write block of FIG. 3, in accordance with various embodiments of the present disclosure.

FIG. 4 illustrates an exemplary timing diagram of the operation of the write block 50 of FIG. 3, in accordance with various embodiments of the present disclosure. At the beginning of a write operation, the HDC 22 may intend to write a full data sector (e.g., SPLIT_EN may be low). The HDC 22 may transmit a high write data valid signal WDV to the R/W channel 24, which may be used to validate or qualify the data signal WDATA. As previously discussed, WDV may be transmitted to the encoder 66 and/or written to write format buffer 58 of the write format block 50 of FIG. 3.

Along with transmission of WDV, the HDC 22 may start transmitting input data bits using WDATA, which may be intended to be written to the media 26. The WDATA may transmit data in the form of codewords, wherein each codeword may include plurality of symbols. In various embodiments, after the encoder 66 receives the first codeword, it may encode the first codeword to generate corresponding parity bits. In various embodiments, the encoder 66 may be an LDPC encoder, and the parity bits may be LDPC parity bits.

In various embodiments, once the encoder 66 encodes the first LDPC parity bits (corresponding to the first codeword) and transmits it to the parity buffer 70, the write block 50 may generate a WDATA_RDY signal to indicate that LDPC parity bits are available inside the channel parity buffer 70. The WDATA_RDY may also indicate that the channel is ready to start writing to the media 26 (as the write block 50 has sufficient parity bits stored in the parity buffer 70 to start the write operation).

Referring again to FIG. 3, once the HDC 22 receives the WDATA_RDY high signal, the HDC 22 may transition the WGATE signal from low to high. This transition of the WGATE may be an indication for the write block 50 to start writing to the media 26. As WGATE does not transmit any data to be written to the media 26, in various embodiments, the WGATE signal may be simply a pulse, with a minimum width of, for example, 12 WCLK.

The HDC 22 may intend to inform the R/W channel 50 the number symbols (or codewords) the HDC 22 intends to write to the media 26 corresponding to one assertion of the WGATE. For example, if the HDC 22 intends to write N number of symbols while the WGATE is asserted, it may transmit the number N to the WGATE using a symbol count signal SYM_CNT. In various embodiments, the HDC 22 may transmit the SYM_CNT signal to the channel 24 upon receiving the WDATA_RDY signal or upon transmitting the WDV signal. The SYM_CNT may enable the R/W channel 24 to know in advance how many symbols are to be written to the media 26, and the R/W channel 24 may time its various operations accordingly.

Once the R/W channel 24 receives the WGATE high from the HDC 22, the write block may start writing data (received over WDATA signal) to the media 26. The write block 50 may internally generate and/or output to the HDC 22 a control signal WGATE_OUT to indicate that it is writing the data to the media 26. The WGATE_OUT signal may be high while the write operation to the media 26 is being carried out. In various embodiments, the rising edge of the WGATE_OUT may be marginally delayed relative to the rising edge of the WGATE signal. After the WGATE_OUT is high, the write block 50 may output a WRITE_OUTPUT data signal to the media 26. The WRITE_OUTPUT may include a prefix field PLO, which may be a special pattern written at the beginning of a data sector (or whenever a write operation is initiated).

In various embodiments, the HDC 22 may also transmit a WPLO signal to the write block 50 to instruct the write block 50 to start writing SM1 or SM2. The SM1 and/or SM2 field may be another prefix field for each data sector (or each section or each codeword) of data to be written to the media 26. Alternatively, the SM1 and/or SM2 may be prefixed each time a write operation is initiated. The SM1 and/or SM2 field may be a special data pattern and may be helpful to recognize the beginning of a data section while the data section is being read from the media 26 by the R/W channel 24 during a read operation. In various embodiments, a distance from a WPLO falling edge to an end of SM1 and/or SM2 may be about 12 WCLK and this number may be changed by programming one or more related registers (not illustrated in FIG. 3). The WPLO may be asserted by the HDC 22 after asserting the WGATE, as illustrated in FIG. 3, and hence, the falling edge of the WPLO may be inside the high portion of WGATE. The SM1 and the SM2 may represent different patterns, and may indicate, for example, different types of data. SM1 and/or SM2 may be augmented with the data by the multiplexer 80 of the write block 50 in FIG. 3.

The encoder 66 may continue to receive WDATA and continue to generate corresponding LDPC parity bits. Also, part of the WDATA may be converted by the parallel to serial converter 74 and multiplexed by the corresponding parity bits by the multiplexer 76.

Once the sync mark field is transmitted, the codewords received over the WDATA and formatted and/or encoded by various components of the R/W channel 24 (e.g., encoder 66, write format buffer 58, parallel to serial converter 74 and/or any other component of the R/W channel 24) may be output as WRITE_OUTPUT and written to the media 26.

While a sector of data is being received, formatted and/or written by the write channel 50, several error conditions may interrupt the process. For example, when the write format buffer 58 or the parity buffer 70 is almost full, a BUFFER_FULL signal may be generated by the R/W channel 24 to request the HDC 22 to stop sending further data over the WDATA signal, as illustrated in FIG. 4. In various embodiments, once the HDC 22 receives the BUFFER_FULL signal, the HDC 22 may stop sending WDATA within a certain number of write clock WCLK (e.g., within 16 WCKLs).

The interruption in data transmission may also be caused by other conditions (e.g., during a parity error, when the parity bits are not consistent with the WDATA, and/or other error conditions like loss of WCLK, etc.). The R/W channel 24 may issue a WRITE_FAULT signal to the HDC 22 in such a fault event.

Referring again to FIG. 4, once the BUFFER_FULL signal (and/or the WRITE_FAULT signal) is asserted, the WDV may be de-asserted within 16 WCLKs to avoid the write format buffer 58 and/or the parity buffer 70 being overflowed. Once the WDV is de-asserted, the HDC 22 may stop transmitting further data over WDATA.

As the reason of the interruption is resolved (e.g., as the write format buffer 58 or the parity buffer 70 is again ready to receive data, resulting in de-assertion of the BUFFER_FULL signal), data transmission from the HDC 22 to the R/W channel 24 may re-start. However, data transmission may begin from the point where it was terminated before (when the interruption was issued), and hence, data transmission may re-start from the middle of a data sector. Thus, as previously discussed, the SPLIT_EN signal may now be high.

As the LDPC parity bits may already have been generated for a portion of the data sector by the encoder 66, when data transmission is re-started after an interruption, the HDC 22 may not need to wait for the encoder 66 to indicate that the encoder 66 has generated the LDPC parity bits. That is, the HDC 22 may not wait for the WDATA_RDY signal to be high for re-transmitting data after any interruption. Accordingly, the HDC 22 may not care about the WDATA_RDY signal, and may generate the WGATE signal independent of receiving the WDATA_RDY signal, when the SPLIT_EN is high. After receiving the WGATE high signal, the write block 50 may once again proceed to write the remaining portion of the data sector to the media 26.

Figure 5:
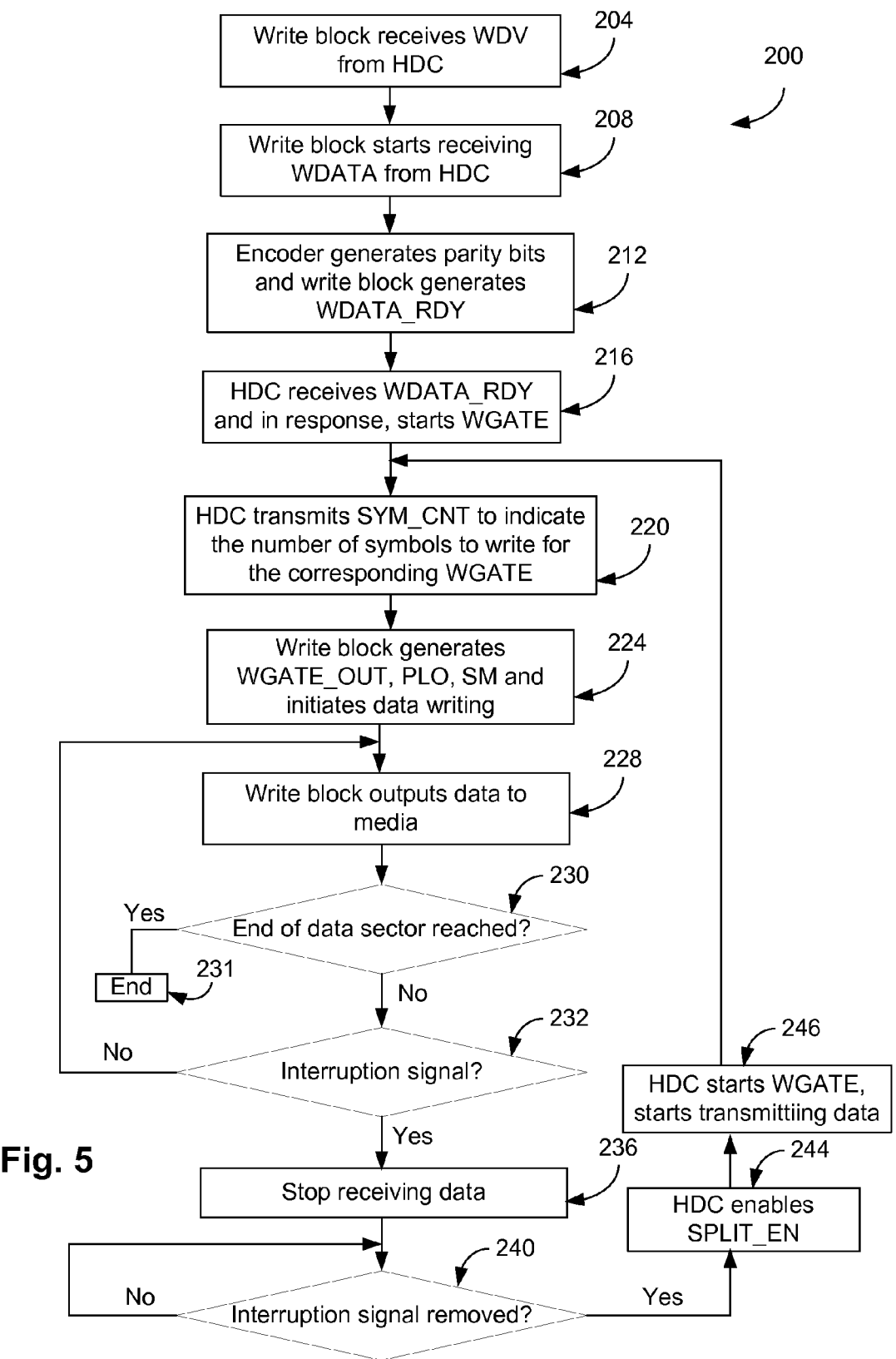
FIG. 5 illustrates an exemplary flow diagram of a method of writing to the media by the R/W channel of FIG. 2, in accordance with various embodiments of the present disclosure.

FIG. 5 illustrates an exemplary flow diagram of a method 200 of writing to the media 26 by the R/W channel 22 of FIG. 2, in accordance with various embodiments of the present disclosure. Referring to FIGS. 2-5, at 204, at the beginning of a write operation, the write block 50 may receive a WDV high signal from the HDC 22, and may start receiving data WDATA to be written in the media 26 at 208.

The encoder 66 may generate parity bits from the first codeword received in the WDATA, and once the LDPC parity bits are available in the parity buffer 70, the write block 50 may generate a WDATA_RDY signal at 212. The HDC 22 may receive the WDATA_RDY signal and infer that the R/W channel 24 is ready to write data in the media 26. Accordingly, in response to receiving the WDATA_RDY high, the HDC 22 may start the WGATE at 216.

At 220, the HDC 22 may transmit the SYM_CNT to indicate the number of symbols it intends to write for the corresponding WGATE. At 224, the write block 50 may generate the WRITE_OUT signal indicating the start of writing data in the media 26, and also generate PLO and SM fields as prefix for the data to be written to the media 26.

At 228, the write block may write the output data to the media 26. The output data may include data received over WDATA from the HDC 22 after being properly formatted (e.g., by including parity bits generated by the encoder 66 and/or by being formatted by the encoder 66 and/or parallel to serial converter 74, etc.) by the write block 50.

The write block 50 may continue to write data to the media until an end of the current data sector has been reached, indicated by an "End" at 231. The End at 231 indicates an end of writing the current data sector, and does not necessarily indicate an end of the writing operation. For example, the R/W channel 24, after reaching at 231, may perform any appropriate action, including but not limited to writing a next sector of data, waiting for further instruction from the HDC 22, reading data from the media 26, remaining ideal, etc.

If the end of data sector has not been reached (i.e., No at 230), the write block 50 and/or may check for any interruption signals (e.g., BUFFER_FULL, WRITE_FAULT, etc.) at 232. If no interruption signal is received at 232, the write block 50 may continue receiving data from the HDC 22 and writing the received data (after appropriate formatting) to the media 26. In case an interruption signal is received, the HDC 22 may stop transmitting data to the R/W channel 26 at 236, and wait for the interruption signal to be removed at 240. Once the interruption signal is removed (e.g., once the write format buffer 58 and/or the parity buffer 70 is again ready to receive data), at 244, the HDC 22 may enable the SPLIT_EN signal, start the WGATE at 246, and continue transmitting data. Subsequently, the HDC 22 may again transmit the SYM_CNT at 220, and continue the write operation, as previously discussed.

Figure 6:
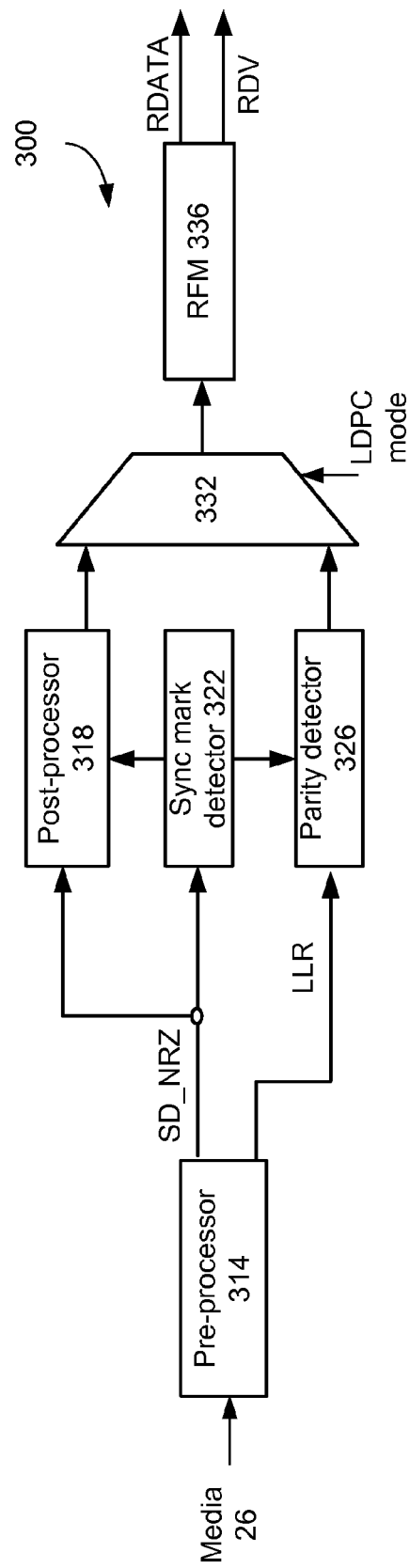
FIG. 6 illustrates a read block included in the R/W channel of FIG. 2, in accordance with various embodiments of the present disclosure.

FIG. 6 illustrates a read block 300 included in the R/W channel 24 of FIG. 2, in accordance with various embodiments of the present disclosure. The read block 300 may be used to read data from the media 26, process the data (e.g., encode, decode and/or format the data), and transmit the data to the HDC 22.

In various embodiments, the read block 300 may include a pre-processor 314, which may be configured to receive data from the media 26. The pre-processor 314 may include a suitable pre-processing algorithm to process data received from the media 26, e.g., a soft output Viterbi algorithm (SOVA). The output of the pre-processor 314 may be coupled to a post-processor 318, a sync-mark detector 322 and/or a parity decoder 326. In various embodiments, the parity decoder 326 may be an LDPC parity decoder.

In various embodiments, the sync-mark detector 322 may identify SM1 and/or SM2 at the beginning of a received codeword, and transmit the identification information to the post-processor 318 and/or the parity decoder 326. Once the parity decoder 326 knows about the beginning of a data section, the parity decoder 326 may decode the parity bits included in the received data. Similarly, the post-processor 318 may perform post-processing of the received data. The outputs of the parity decoder 326 and the post-processor 318 may be coupled to a multiplexer 322, the output of which may be coupled to a read format unit (RFM) 336. The RFM 336 may appropriately format the received data, before transmitting it to the HDC 22 along with a read data valid signal RDV.

In various embodiments, the HDC 22 may intend to read either a full sector or a split sector of data from the media 26, through the read block 300 included in the R/W channel 24. For example, at the beginning of reading a sector of data from the media 26, the HDC 22 may intend to read the full sector of data from the media 26. However, the reading process may be interrupted for various reasons, including but not limited to a buffer overflow condition in the R/W channel 24, an error condition in the reading process, receiving a READ_FAULT signal from the R/W channel 24, a split in the data read from the media 26, a buffer overflow condition in a buffer (not illustrated in FIG. 6) in the channel 24, etc. When the cause of the interruption is resolved, e.g., when re-starting the read process, the HDC 22 may intend to read only the remaining part of the data sector (the first part being read before the interruption), resulting in reading only a split data sector. In various embodiments, the HDC 22 may generate the split enable signal SPLIT_EN (similar to the signal the HDC 22 generates while writing data to the media 26) to indicate that it intends to read a split data sector.

In various embodiments, at the start of a read operation, the R/W channel 24 may receive a high read gate signal RGATE. In various embodiments, the HDC 22 may allow the channel 24 to generate an internal RGATE based on a SYM_CNT signal or allow the channel 24 to use an external RGATE supplied by the HDC 22. The RGATE may inform the read block 300 to start reading from the media 26.

One iterative codeword may contain hundreds, or even thousands of user symbols. The HDC 22 may transmit a symbol count signal SYM_CNT that may indicate the number of symbols the HDC 22 intends to read for a corresponding RGATE. For example, the SYM_CNT may be the number of symbols included in an iterative codeword that the HDC 22 intends to read.

The read block 300 may also generate an RDV signal to indicate that the read data is valid on an RDATA bus. In various embodiments, the read block may operate in an LDPC mode or a non-LDPC mode (controlled, for example, by the multiplexer 332). In the LDPC mode, the length of the RDV signal may be LDPC codeword long, whereas in the non-LDPC mode, the length of the RDV signal may be equal to the number of symbols in each RGATE.

The read block 300 may also generate a sync mark detection signal SM_DET (which may be, for example, a 3 bit symbol) to indicate if the sync mark detector 322 has detected any sync mark signals. For example, the SM_DET may be 100 if no SM is found, 101 if SM1 is found, 110 if SM2 is found, and 111 if the sync mark detector 322 is forced to generate a sync mark field (upon detecting an absence of the same). In various embodiments, the SM_DET may be output by the read block 300 to the HDC 22.

Figure 7:
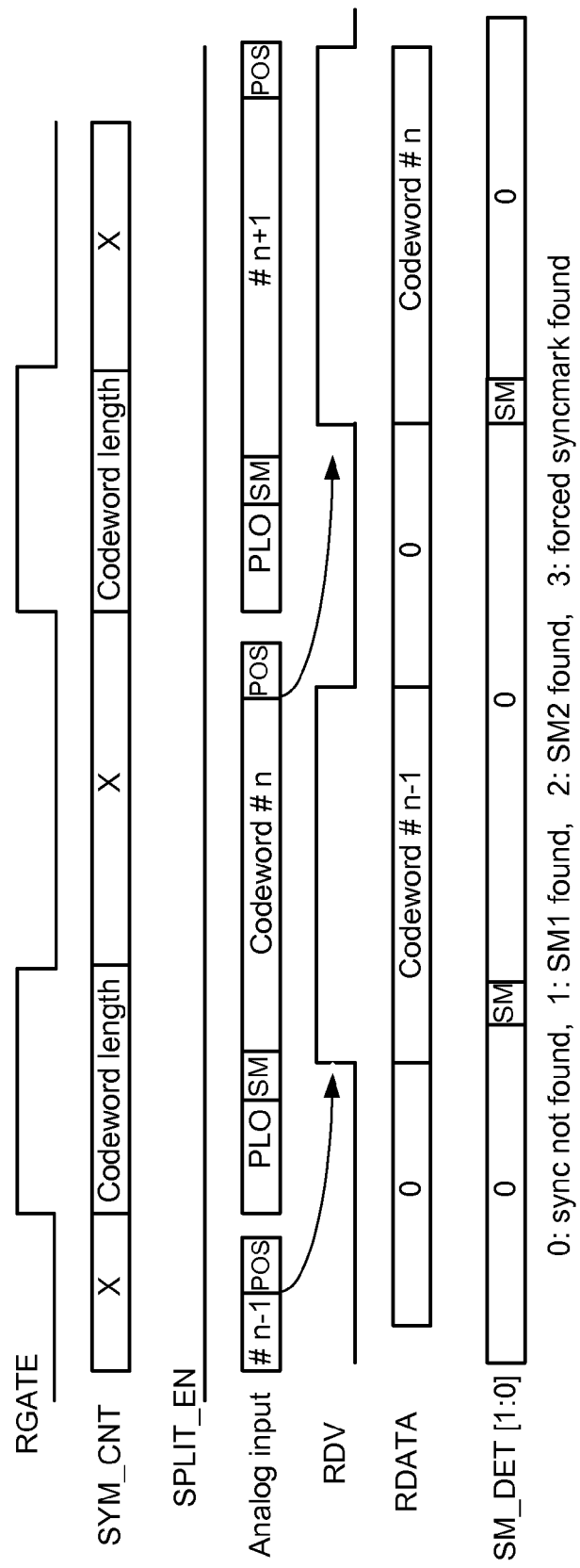
FIG. 7 illustrates an exemplary timing diagram of the operation of the read block of FIG. 6, in accordance with various embodiments of the present disclosure.

FIG. 7 illustrates an exemplary timing diagram of the operation of the read block 300 of FIG. 6, in accordance with various embodiments of the present disclosure. In the read operation of FIG. 7, the SPLIT_EN signal is not enabled, and accordingly, FIG. 7 is associated with a read operation which is not interrupted for any reason and an entire data sector is being read.

As previously discussed, the read block 300 may receive the RGATE signal, in response to which the channel 24 may start decoding an analog input signal it reads from the media 26. In various embodiments, for each assertion of the RGATE signal, the channel 24 may want to read, decode and/or format a single codeword.

The read block 300 may also receive a symbol count SYM_CNT signal from the HDC 22, which may indicate the number of symbols to be read. For example, in an LDPC mode, the SYM_CNT signal may indicate a number of symbols included in the codeword to be read.

Once the read block 300 has decoded sufficient symbols (and/or codewords) and is ready to transmit data to the HDC 22, the channel 24 may assert a high RDV signal. In various embodiments, the channel 24 may assert the high RDV signal for a codeword only after the read block 300 has received the codeword from the media 26 and decoded the codeword. For example, as illustrated in FIG. 7, the channel 24 may assert the RDV signal for the codeword n-1 after the read block 300 has received and decoded the codeword n-1.

In various embodiments, the channel 24 may output a SM_DET signal after asserting the RDV signal, as previously discussed in more details. With the assertion of the high RDV signal, the RDATA may start transferring the codeword, received by the read block 300, from the media 26 to the HDC 22.

In various embodiments, the R/W channel 24 may assert the RDV signal for each iterative codeword that the channel 24 receives from the media 26 and decodes. That is, once the channel 24 transmits a received and decoded codeword to the HDC 22, the channel may de-assert the RDV, and wait for the next codeword to be received and decoded, as illustrated in FIG. 7. Thus, the length of the RDV may be one iterative codeword.

Figure 8:
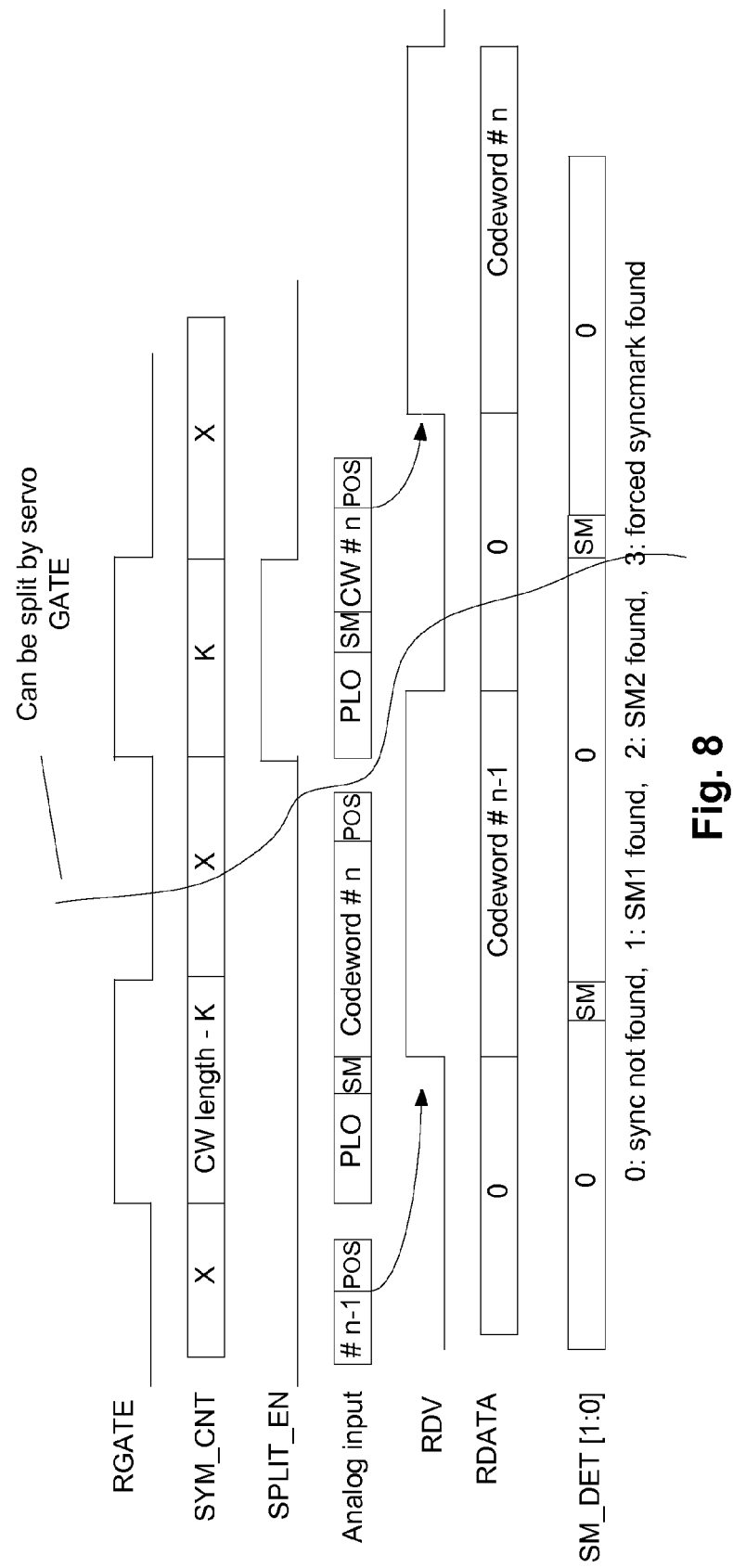
FIG. 8 illustrates another exemplary timing diagram of the operation of the read block of FIG. 6, in accordance with various embodiments of the present disclosure.

FIG. 8 illustrates another exemplary timing diagram of the operation of the read block 300 of FIG. 6, in accordance with various embodiments of the present disclosure. The read operation of FIG. 8 illustrates a scenario where the read operation is interrupted, and accordingly, FIG. 8 is associated with a read operation which has a high SPLIT_EN signal for a certain duration of the read operation.

The first part of FIG. 8 is similar to that of FIG. 7. However, the read operation of FIG. 8 is illustrated to be interrupted while the channel is reading codeword n. As previously discussed, an interruption may be caused by a variety of reasons, including, but not limited to, a read fault (READ_FAULT) during the read operation, an overflow of a buffer (not illustrated in FIG. 6) in the read block 300, and/or any other fault in the media 26, channel 24, and/or HDC 22.

Referring again to FIG. 8, if the reading process is interrupted while reading codeword n, once the cause of the interruption is resolved (indicated by, for example, disabling the fault signal and/or asserting a fault clear signal), the reading operation may resume from the point where it was interrupted. Thus, the channel 24 may read the remaining symbols of the codeword n, decode the codeword n, and then assert the high RDV signal for the codeword n, as illustrated in FIG. 8.

In various embodiments, if the HDC 22 needs to read a new data sector, which may include a plurality of codewords, the channel 24 may abort reading the current data sector and start reading the new sector. The HDC 22 may finish reading a data sector before re-trying to read any previously aborted read operation corresponding to another sector.

Figure 9:
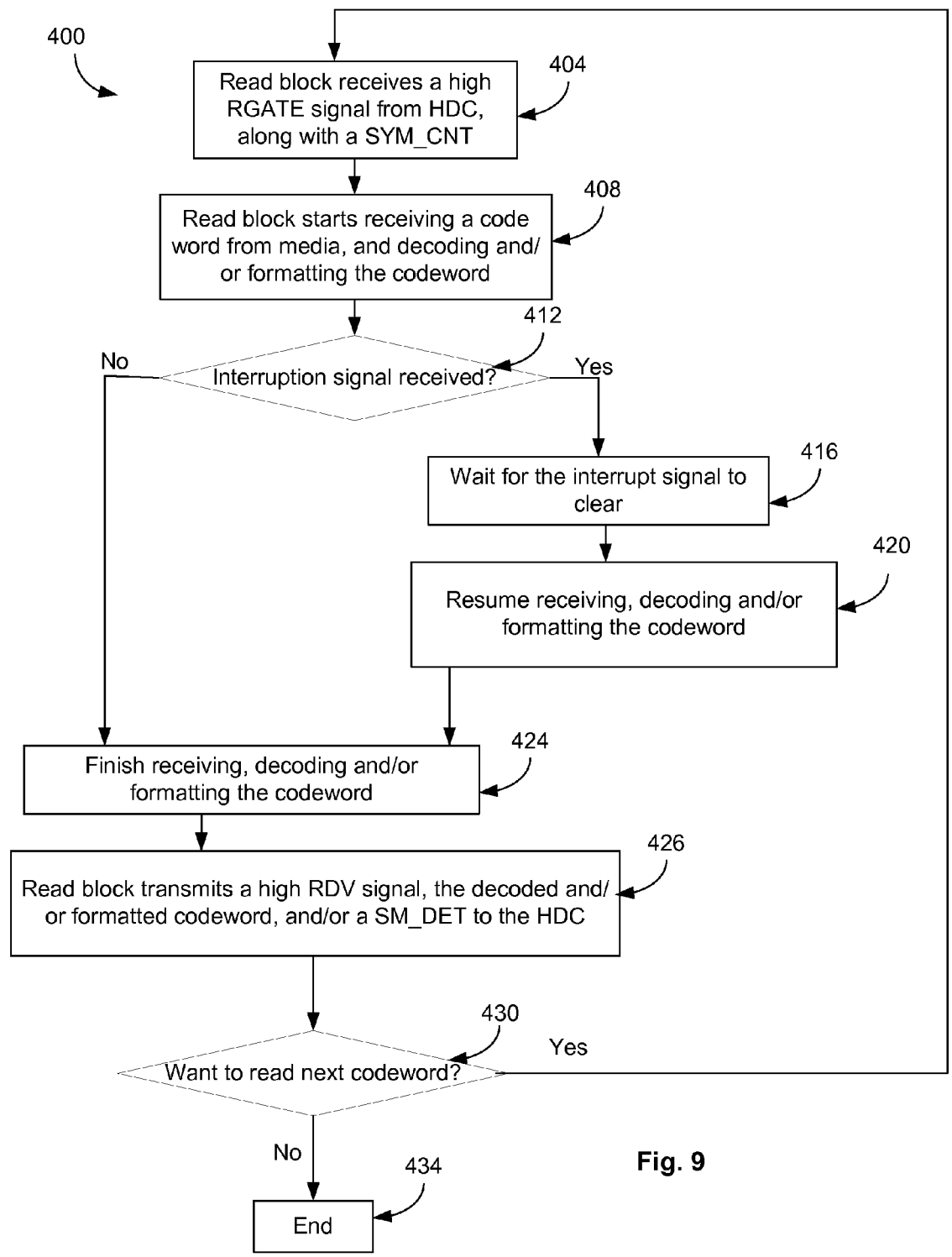
FIG. 9 illustrates an exemplary flow diagram of a method of reading from the media by the R/W channel of FIG. 2, in accordance with various embodiments of the present disclosure.

FIG. 9 illustrates an exemplary flow diagram of a method 400 of reading from the media 26 by the R/W channel 24 of FIG. 2, in accordance with various embodiments of the present disclosure. Referring to FIGS. 2 and 6-9, at 404, the read block 300 included in the R/W channel 24 may receive a asserted RGATE signal from the HDC 22, along with a SYM_CNT signal that may indicate the number of symbols the HDC 22 intends to read for the corresponding RGATE. For example, the SYM_CNT may be the number of symbols included in an iterative codeword that the HDC 22 intends to read.

At 408, the read block 300 may start receiving a codeword from the media 26. In various embodiments, the read block 300 may also start decoding and/or formatting the symbols of the codeword as soon as the read block 300 receives those symbols, before receiving the entire codeword. That is, the read block 300 may start decoding and/or formatting a portion of the received codeword, even before receiving the full codeword. It will be apparent to those skilled in the art that in various other embodiments, the read block 300 may wait to decode and/or format the codeword only after receiving the entire codeword.

During the reception of the codeword, if an interruption signal is received (i.e., Yes at 412), the read block 300 may wait for the interruption signal to be cleared at 416, and subsequently, may resume receiving, decoding and/or formatting the codeword at 420. In various embodiments, the read block may also receive a SPLIT_EN high signal from the HDC 22 indicating that the codeword currently read is a split sector codeword (not illustrated in FIG. 9).

If no interruption signal is received, the read block 300 may finish receiving, decoding and/or formatting the codeword at 424, transmit a high RDV signal to the HDC to indicate availability of the codeword for transmission to the HDC 22, and transmit the codeword (along with a SM_DET signal) to the HDC 22 at 426.

If the HDC 22 desires to read another codeword (i.e., Yes at 430), the process is repeated from 404. Otherwise, at 434, the read process is terminated.

The disk drive system and the corresponding write and read methods of FIGS. 2-9, in accordance with various embodiments of the present disclosure, provide a variety of efficiencies not found in a conventional disk drive system. For example, the SYM_CNT signal, as previously discussed, may enable the channel 24 to have prior information on the number of symbols that is to be read or written. Having this type of information may be advantageous for several reasons. For example, in a 10/11 bit mode (e.g., when data signal (e.g., WDATA and/or RDATA) between the HDC 22 and the channel 24 is 10 bits and the data signal between the channel 24 and the media 26 is 11 bits) of operation, this type of information may help the channel 24 to time its various signals in a more appropriate manner. For example, in this mode of operation, the channel 24 may be writing data to the media 26 faster than it may be receiving data from HDC 22. If the channel 24 knows how many symbols are to be written to the media 26, the channel may either wait for more symbols to arrive from the HDC 22 (in case the channel 24 has not yet written the intended number of symbols to the media 26) or may perform other operations (in case the channel 24 has already written the intended number of symbols to the media 26).

Also, there are several other efficiencies of the apparatus and methods described with respect to FIGS. 2-9. For example, the WDATA_RDY enables the HDC 22 to know when to transmit an additional codeword to the channel 24 and when to enable writing to the media 26. In conventional disk drive systems, the HDC 22 may need to periodically check the channel 24 to know when data should be written to the media 26. Also, the WRITE_FAULT and the BUFFER_FULL signal may help in proper coordination of all related components during a fault condition.

Figure 10:
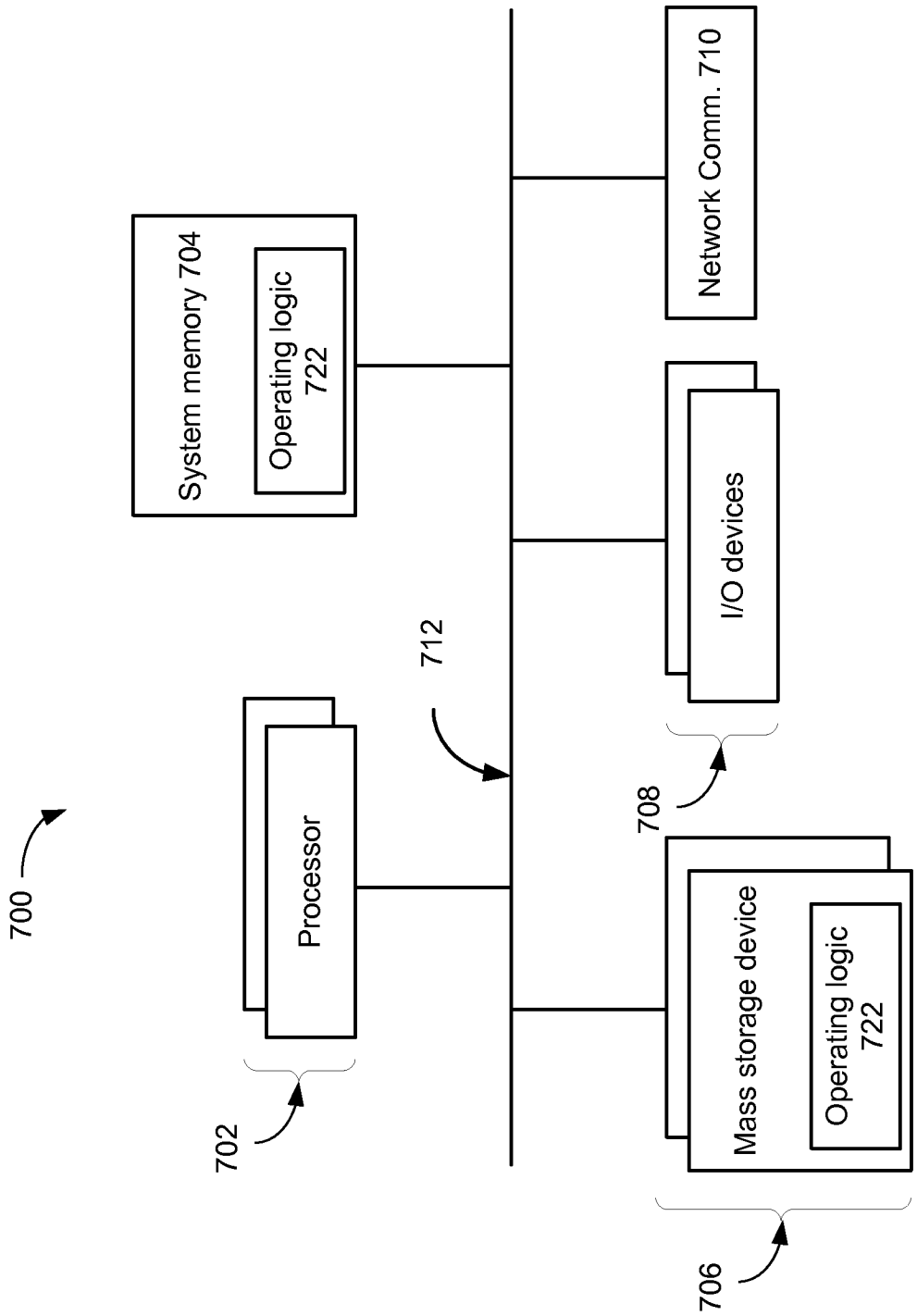
FIG. 10 is a block diagram of an exemplary system, in accordance with various embodiments of the present disclosure.

FIG. 10 is a block diagram of an exemplary system suitable for use to practice the present disclosure, in accordance with various embodiments. As illustrated, system 700 includes one or more processors or processor cores 702, and system memory 704. For the purpose of this application, including the claims, the terms "processor" and "processor cores" may be considered synonymous, unless the context clearly requires otherwise. Additionally, system 700 includes mass storage devices 706 (such as diskette, hard drive, compact disc read only memory (CDROM) and so forth), input/output devices 708 and communication interfaces 710 (such as network interface cards, modems and so forth). The elements of FIG. 10 may be coupled to each other via system bus 712, which represents one or more buses. In the case of multiple buses, they may be bridged by one or more bus bridges (not illustrated).

Each of these elements performs its conventional functions known in the art. In particular, system memory 704 and mass storage 706 may be employed to store a working copy and a permanent copy of the programming instructions implementing all or a portion of earlier described functions, herein collectively denoted as 722. The instructions 722 may be assembler instructions supported by processor(s) 702 or instructions that can be compiled from high level languages, such as C.

The permanent copy of the programming instructions may be placed into permanent storage 706 in the factory, or in the field, through, for example, a distribution medium (not shown), such as a compact disc (CD), or through communication interface 710 (from a distribution server (not shown)). That is, one or more distribution media having instructions 722 may be employed to distribute the instructions 722 and program various computing devices. The constitution of these elements 702-712 are generally well known, and accordingly will not be further described.

In various embodiments, the system 700 may include one or more disk drive systems, such as the disk drive system illustrated in FIGS. 2-3 and 6. The HDC and the R/W channel of the disk drive system may be integrated in a single chip, namely a SOC. In various embodiments, the disk drive system may be included in the mass storage device 706. Alternatively, a part of the disk drive system (e.g., the HDC and/or the R/W channel) may be external to the mass storage system 706, and coupled to the mass storage system 706 through, for example, bus 712. The disk drive system may also include a media, in which data may be written to or from which data may be read. In various embodiments, the media may be included in the mass storage system 706. The programming instructions stored in logic 722 and/or the processor 702 may be configured to control one or more operations of the disk drive system, including the HDC, the R/W channel and/or the media.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present disclosure. This present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment discussed herein. Therefore, it is manifested and intended that the invention be limited only by the claims and the equivalents thereof.

What is claimed is:

1. A method comprising:
    receiving a stream of codewords from a hard disk controller;
    using a low-density parity check coding algorithm, encoding at least a first codeword from the stream of codewords;
    based at least in part on encoding at least the first codeword, transmitting a write data ready signal to the hard disk controller;
    responsive at least in part to transmitting of the write data ready signal to the hard disk controller, receiving a write gate signal from the hard disk controller, wherein the write gate signal is configured to request a read/write channel to write at least a first part of the stream of codewords to a media;
    receiving a symbol count signal from the hard disk controller, wherein the symbol count signal indicates a number of symbols to be written corresponding to the write gate signal; and
    responsive at least in part to receipt of the write gate signal from the hard disk controller, requesting the read/write channel to write at least the first part of the stream of codewords to the media, wherein the first part of the stream of codewords corresponds to the number of symbols to be written corresponding to the write gate signal.

2. The method of claim 1, further comprising:
    receiving, at the hard disk controller, an interruption signal; and
    responsive at least in part to receiving the interruption signal, interrupting the receiving of the stream of codewords from the hard disk controller.

3. The method of claim 2, wherein the receiving the interruption signal at the hard disk controller further comprises:
    responsive at least in part to at least one of (i) a write format buffer and (ii) a parity buffer in the read/write channel becoming substantially full, receiving the interruption signal at the hard disk controller.

4. The method of claim 2, further comprising:
    clearing the interruption signal; and
    responsive to the clearing of the interruption signal, resuming receiving the stream of codewords from the hard disk controller.

5. The method of claim 1, further comprising:
    encoding a stream of codewords using the low-density parity check coding algorithm; and
    transmitting the encoded stream of codewords to the media.

6. An apparatus comprising:
    a memory; and
    one or more processors,
    wherein the one or more processors is operable to cause the apparatus to
        receive a stream of codewords from a hard disk controller;
        encode, using a low-density parity check coding algorithm, at least a first codeword from the stream of codewords;
        transmit a write data ready signal to the hard disk controller, based at least in part on encoding at least the first codeword;
        receive a write gate signal from the hard disk controller, responsive at least in part to transmission of the write data ready signal to the hard disk controller, wherein the write gate signal is configured to request a read/write channel to write at least a first part of the stream of codewords to a media;
        receive a symbol count signal from the hard disk controller, wherein the symbol count signal indicates a number of symbols to be written corresponding the write gate signal; and
        request the read/write channel to write at least the first part of the stream of codewords to the media, in response to receiving the write gate signal from the hard disk controller, wherein the first part of the stream of codewords corresponds to the number of symbols to be written corresponding to the write gate signal.

7. The apparatus of claim 6, wherein the one or more processors is further operable to cause the apparatus to
    receive an interruption signal at the hard disk controller; and
    interrupt the receipt of the stream of codewords from the hard disk controller, in response at least in part to receiving the interruption signal.

8. The apparatus of claim 7, wherein the one or more processors is further operable to cause the apparatus to receive the interruption signal in response at least in part to at least one of (i) a write format buffer becoming substantially full, and (ii) a parity buffer in the read/write channel becoming substantially full.

9. The method of claim 7, wherein the one or more processors is further operable to cause the apparatus to
    clear the interruption signal; and
    resume receiving the stream of codewords from the hard disk controller in response to the interruption signal being cleared.

10. The method of claim 6, wherein the one or more processors is further operable to cause the apparatus to
    encode the received stream of codewords using the low-density parity check coding algorithm; and
    transmit the encoded stream of codewords to the media.

11. A method comprising:
    receiving a read gate signal from a hard disk controller;
    receiving a symbol count signal from the hard disk controller, wherein the symbol count signal indicates a number of symbols to be read corresponding to the read gate signal;

receiving a first codeword from a media, wherein the first codeword includes the number of symbols indicated by the symbol count signal, and before the entire first codeword is received from the media, receiving a fault signal at the hard disk controller, wherein the receipt of the fault signal at the hard disk controller interrupts the receiving of the first codeword;

receiving a remainder of the first codeword from the media in response to receiving a fault clear signal;

decoding and formatting the received first codeword; and transmitting a read data value signal and at least the first codeword to the hard disk controller.

\* \* \* \* \*